US008753180B2

(12) United States Patent
Hutchins

(10) Patent No.: US 8,753,180 B2
(45) Date of Patent: Jun. 17, 2014

(54) METHODS AND APPARATUS FOR STRIPPING LEAVES FROM A STALK CURED TOBACCO PLANT

(75) Inventor: Dale Hutchins, Bennettsville, SC (US)

(73) Assignee: Dale Hutchins, Bennettsville, SC (US)

( * ) Notice: Subject to any disclaimer, the term of this patent is extended or adjusted under 35 U.S.C. 154(b) by 1994 days.

(21) Appl. No.: 11/930,674

(22) Filed: Oct. 31, 2007

(65) Prior Publication Data

US 2009/0107103 A1 Apr. 30, 2009

(51) Int. Cl.
*A01D 45/16* (2006.01)
(52) U.S. Cl.
USPC .............................. 460/134; 131/313; 56/27.5
(58) Field of Classification Search
USPC ........ 56/27.5, 33–35, 62, 104, 126–130, 330; 460/134–140; 131/313–327
See application file for complete search history.

(56) References Cited

U.S. PATENT DOCUMENTS

| | | |
|---|---|---|
| 1,311,183 A | 7/1919 | Seaver |
| 1,518,349 A | 12/1924 | Olson |
| 1,772,014 A | 8/1930 | Phillips |
| 2,574,030 A | 11/1951 | Green |
| 2,696,069 A | 12/1954 | Hawkins |
| 2,876,610 A | 3/1959 | West et al. |
| 2,962,029 A | 11/1960 | McCashen |
| 2,989,056 A | 6/1961 | LaMotte |
| 3,077,985 A | 2/1963 | Anderson |
| 3,083,517 A | 4/1963 | Wilson |
| 3,093,949 A | 6/1963 | Splinter |
| 3,142,304 A | 7/1964 | Hoernemann |
| 3,380,460 A | 4/1968 | Furis, Jr. et al. |
| 3,453,815 A | 7/1969 | Harrington et al. |
| 3,507,103 A | 4/1970 | Pickett et al. |
| 3,654,753 A | 4/1972 | Gervais |
| 3,750,882 A | 8/1973 | Hays |
| 3,765,424 A | 10/1973 | Morrison, Jr. et al. |
| 3,770,112 A | 11/1973 | Asfour |
| 3,772,862 A | 11/1973 | Wilson |
| 3,782,544 A | 1/1974 | Perkins, III |
| 3,845,609 A | 11/1974 | Whitley |
| 3,928,183 A | 12/1975 | Asfour |
| 3,939,983 A | 2/1976 | Asfour |

(Continued)

OTHER PUBLICATIONS

Drawing of a scaled prototype of a Burley Stripper, Caroline Tobacco Services, Offered for sale, sold or demonstrated prior to Oct. 31, 2007, provided by Applicant on Oct. 10, 2008.*

(Continued)

*Primary Examiner* — Richard Crispino
*Assistant Examiner* — Yana B Krinker
(74) *Attorney, Agent, or Firm* — Dority & Manning, P.A.

(57) ABSTRACT

A machine which provides for both leaf stripping and grading can be used to process plants, such as burley tobacco plants, by continuously moving the plants in a first direction while simultaneously varying the position of the plants in a second direction relative to a defoliating apparatus. The plants may be moved horizontally through a machine by a transporter engaging the plant stalks while the vertical distance between the transporter (and thus the plants) is varied relative to the defoliating apparatus. The transporter and defoliating apparatus may be positioned at an angle to one another. Due to the changing amount of vertical distance, leaves from different sections of the plants, such as leaves at different stalk heights, can be contacted and removed at different corresponding horizontal locations in the machine. Accordingly, leaves can be graded based on the location(s) from which they are retrieved after removal.

18 Claims, 13 Drawing Sheets

(56) References Cited

U.S. PATENT DOCUMENTS

| | | |
|---|---|---|
| 3,962,850 A | 6/1976 | Moore |
| 3,992,860 A * | 11/1976 | Bobbitt, Jr. .................... 56/27.5 |
| 4,018,674 A | 4/1977 | Morris |
| 4,037,392 A | 7/1977 | Taylor et al. |
| 4,038,808 A | 8/1977 | Patten et al. |
| 4,069,648 A | 1/1978 | Taylor et al. |
| 4,149,544 A | 4/1979 | Baraut |
| 4,171,607 A | 10/1979 | Taylor et al. |
| 4,192,124 A | 3/1980 | Balthes |
| 4,282,888 A | 8/1981 | Pinkham |
| 4,292,982 A | 10/1981 | Butcher |
| 4,307,562 A | 12/1981 | Seymour et al. |
| 4,332,128 A | 6/1982 | Prince |
| 4,350,172 A | 9/1982 | Guthrie |
| 4,353,377 A | 10/1982 | Seymour |
| 4,353,378 A | 10/1982 | Seymour |
| 4,373,323 A | 2/1983 | Jones |
| 4,407,305 A | 10/1983 | Patterson |
| 4,416,294 A | 11/1983 | Turpin et al. |
| 4,429,861 A | 2/1984 | Range |
| 4,478,227 A | 10/1984 | McKinney et al. |
| 4,493,330 A | 1/1985 | Price |
| 4,498,484 A | 2/1985 | Gilbert |
| 4,509,536 A | 4/1985 | Bennett et al. |
| 4,715,170 A | 12/1987 | Miki |
| 4,773,434 A | 9/1988 | Miyake et al. |
| 4,813,216 A | 3/1989 | Day et al. |
| 4,836,220 A | 6/1989 | Miyake et al. |
| 5,331,980 A | 7/1994 | Bailey |
| 5,362,190 A | 11/1994 | Eaton |
| 5,373,861 A | 12/1994 | Eaton |
| 5,499,635 A | 3/1996 | Haruzono |
| 6,185,921 B1 * | 2/2001 | Taylor ............................ 56/27.5 |
| 6,708,474 B2 | 3/2004 | Taylor |
| 2003/0106298 A1 * | 6/2003 | Taylor ............................ 56/27.5 |
| 2004/0123577 A1 * | 7/2004 | Resing et al. ................... 56/104 |
| 2007/0266689 A1 * | 11/2007 | Calmer ............................ 56/62 |

OTHER PUBLICATIONS

Drawing of a scaled prototype of a Burley Stripper offered for sale, sold or demonstrated prior to Oct. 31, 2007.

* cited by examiner

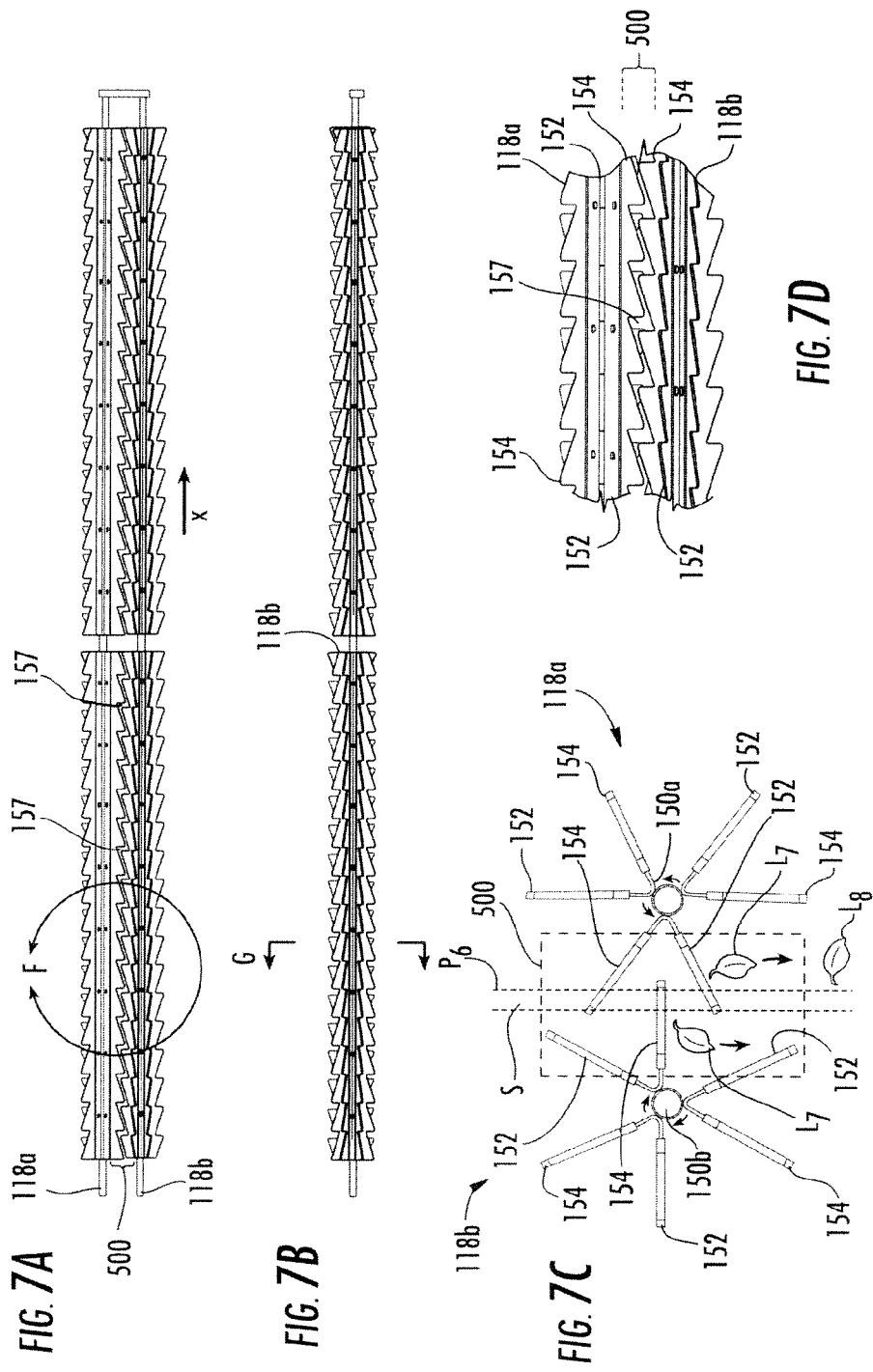

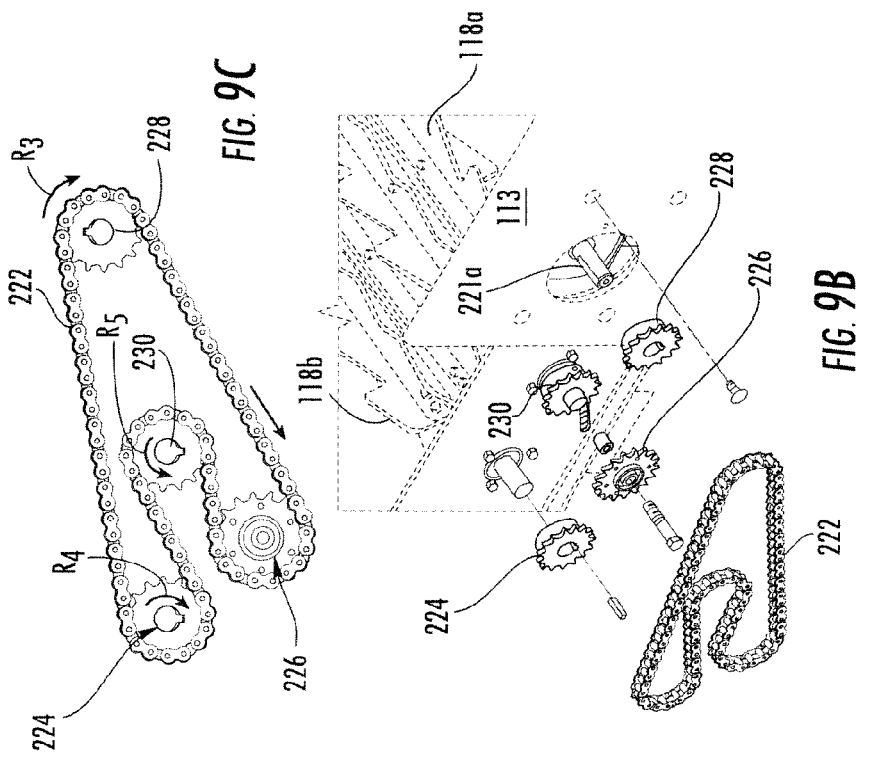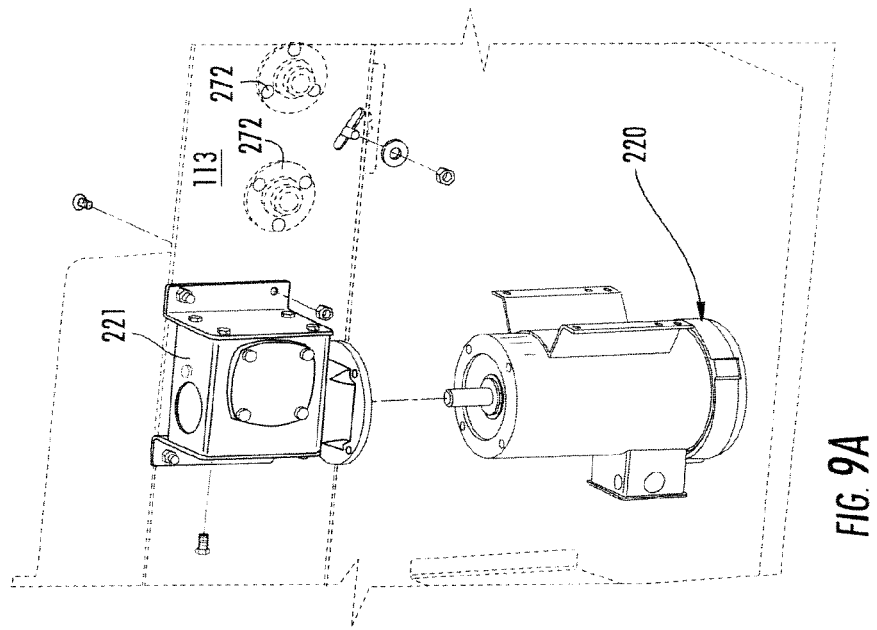

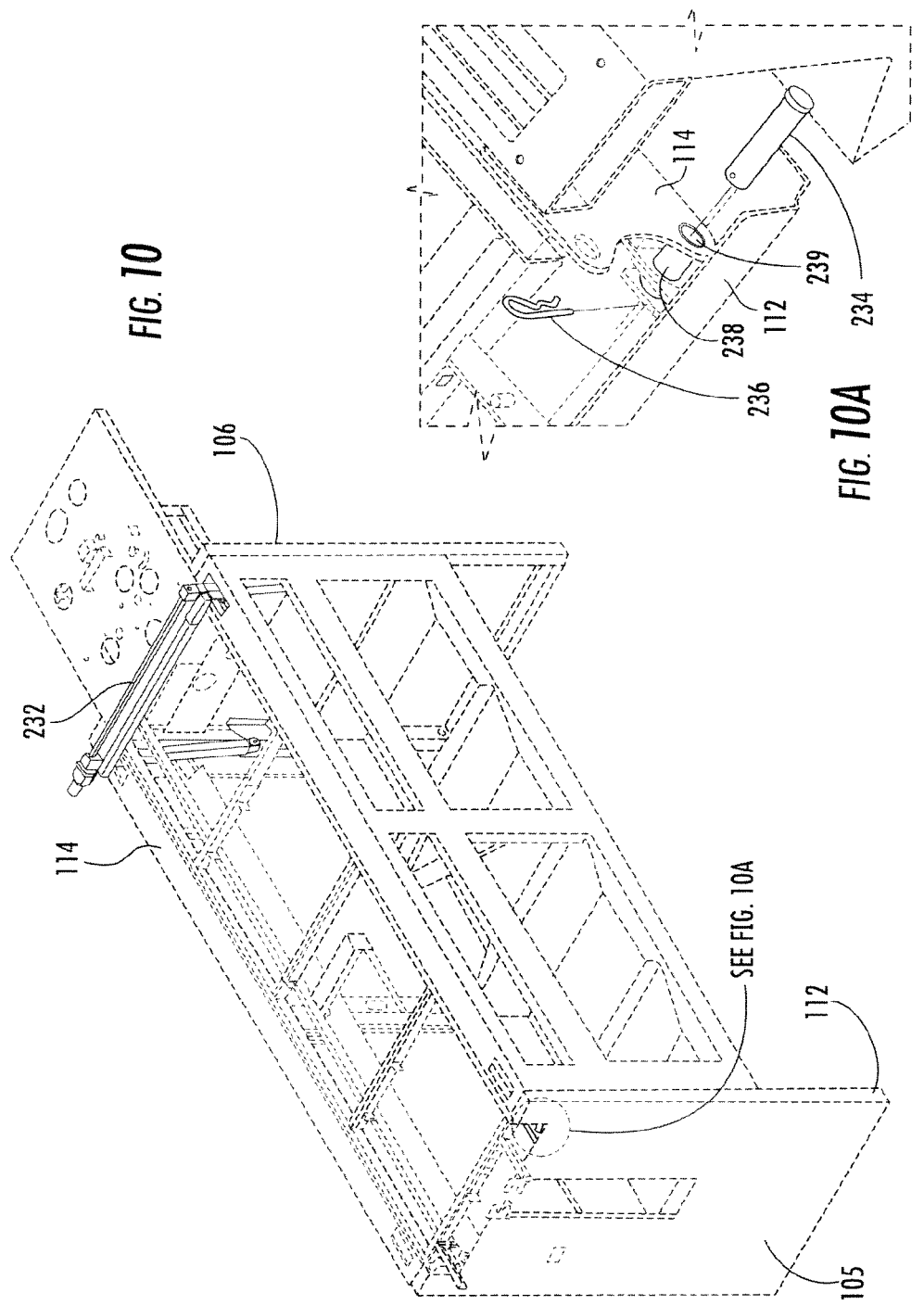

METHODS AND APPARATUS FOR STRIPPING LEAVES FROM A STALK CURED TOBACCO PLANT

BACKGROUND

Certain varieties of tobacco, such as burley tobacco, are cured with the leaves remaining on the stalk. When this type of tobacco is harvested, the entire stalk is cut near the bottom, and the tobacco is hung upside down in a curing barn, shed, or other suitable location. Once cured, the leaves of the tobacco can be removed. However, since the tobacco remains on the stalk, removal can be a labor-intensive task, and often may be performed manually. Moreover, the tobacco may be graded (and sold) based upon its stalk position. This can introduce additional complexity into the leaf removal process since leaf position must be tracked or otherwise considered during removal.

SUMMARY

In accordance with some aspects of the present subject matter, a machine which provides for both leaf stripping and grading can be used to process plants, such as burley tobacco plants, by continuously moving the plants in a first direction while simultaneously varying the position of the plants in a second direction relative to a defoliating apparatus.

For example, the plants may be moved horizontally through a machine by a transporter engaging the plant stalks while the vertical distance between the transporter (and thus the plants) is varied relative to the contact point of a defoliating apparatus. For instance, the transporter and defoliating apparatus may be positioned at an angle to one another. Due to the changing amount of vertical space between the transporter and the defoliating apparatus, leaves from different sections of the plants, such as leaves at different stalk heights, can be contacted and removed at different corresponding horizontal locations in the machine. Accordingly, leaves can be graded based on the location(s) from which they are retrieved after removal.

In some embodiments, the defoliating apparatus can comprise a first and second roller, with each roller having an axis. The rollers may be positioned side-by-side so that the axes of the rollers are parallel. Each roller can comprise one or more sets of fins, with each set of fins extending along the axis of the roller, with the set of fins configured to rotate about the axis of the roller. For example, the fins may be attached to a roller shaft so that when the shaft is turned, the sets of fins turn with the shaft. The rollers may be placed in parallel so that a fin set from each roller alternately enters the plane between the roller axes, without the fins from the rollers colliding. The fins can define a "zone of engagement" where the fins contact the leaves of plants moved between the rollers.

In some embodiments, the fins of the defoliator may be shaped so that as sets of fins from alternating rollers move toward the plane defined by the roller axis, the sets of fins define a "virtual hole" or gap. The gap can comprise a space extending vertically through the zone of engagement unaffected by the fins. For instance, the cross-sectional boundary of the space in the zone of engagement can approximately correspond to the shape of a plant stalk, such as a burley tobacco stalk. Accordingly, in operation, the fins may contact and remove leaves in the zone of engagement while leaving the stalk relatively unaffected.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 7 illustrates a defoliator comprising two rollers;

FIG. 9 illustrates exemplary details for driving rollers in a defoliator;

FIG. 10 illustrates an exemplary frame that allows for a change in height of a transporter to be selectively adjusted; and FIG. 11 illustrates another example of a defoliator comprising two rollers.

Use of like reference numerals is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
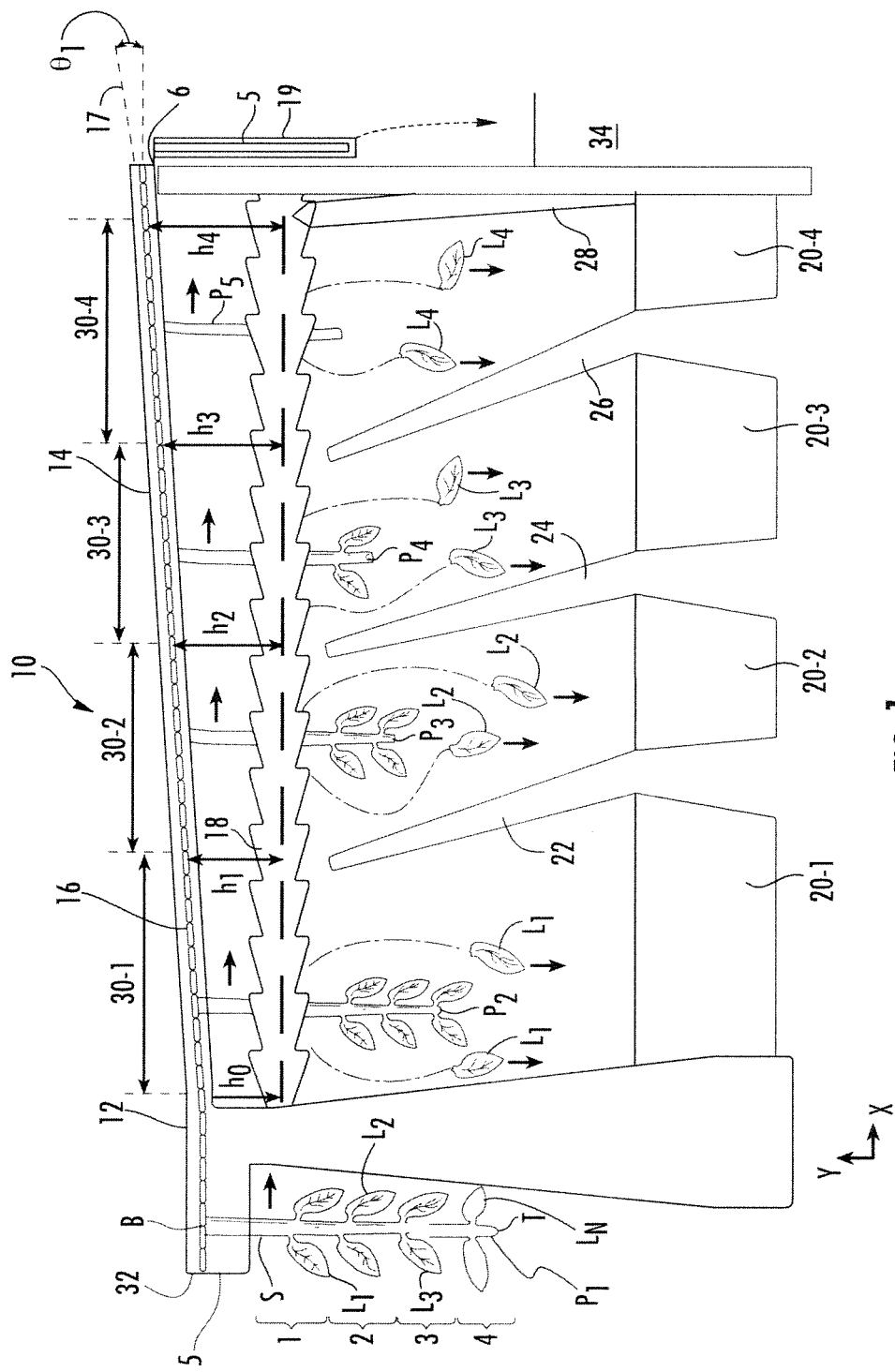
FIG. 1 is a side view of an exemplary leaf stripping and grading machine.

Turning now to FIG. 1, an exemplary embodiment of a leaf stripping and grading apparatus 10 in accordance with aspects of the present subject matter will now be discussed. In this example, several exemplary tobacco plants P1, P2, P3, P4 and P5 will be used to depict various aspects of the operation of stripping/grading machine 10. However, it will be understood that the particular depiction of plants P1-P5 is for purposes of example and illustration only, and in practice, tobacco plants may have a variety of sizes, shapes and other characteristics. In this example, the tobacco plants can be graded according to four different levels of classification illustrated as 1-4 alongside plant P1. Generally speaking, tobacco, such as burley tobacco, may be graded based on the relative location of the leaf on the plant. In this example, area 1 includes leaves closest to the base B of the plant P1, while area 4 includes those leaves closest to the top T of plant P1. Levels 2 and 3 comprise leaves between levels 1 and 4. For purposes of clarity, in this example, leaves at level 1 are labeled as L1, leaves at level 2 are labeled as L2, and so on.

In accordance with some aspects of the present subject matter, plants are advanced through stripping/grading machine 10 so that sequential level of leaves are stripped at corresponding portions of the path along machine 10. In this example, machine 10 extends along a length in the horizontal direction X from intake side 5 to output side 6. For example, in some embodiments, the optimal length of the machine is in the range of about 14 feet. However, the length of the machine can vary according to the number of desired grade levels. During operation, plants are moved in the X direction. Simultaneously, the plants are moved in the vertical direction Y relative to the defoliator so that specific horizontal lengths of machine 10 correspond to areas at which leaves from different zones or regions of the stalks of the tobacco plants are removed. In this example, length 30-1 corresponds to level 1, length 30-2 corresponds to level 2, length 30-3 corresponds to level 3, and length 30-4 corresponds to level 4.

Leaves are removed at the respective levels by a defoliator 18. Defoliator 18 may, for example, comprise a plurality of counter rotating members which are positioned and operated to engage the tobacco leaves and strip the leaves from the stalks S of the tobacco plants. Exemplary details of defoliator 18 will be discussed in further detail below. For instance, as will be discussed below, defoliator 18 may comprise a pair of counter-rotating rollers. The stalks can be engaged by the rollers, which remove the leaves using, e.g., blades or fins on the rolls.

Defoliator 18 is positioned relative to a stalk transporter 16 so that the point or zone at which defoliation apparatus 18 engages stalks varies along the length of the machine. For example, defoliator 18 and stalk transporter 16 are not vertically parallel in this embodiment. Instead, in this example, stalk transporter 16 is positioned relative to the center line 19 of defoliator 18 (representing the approximate vertical center of the zone of engagement where leaves are removed) to define an angle $\theta_1$, which is illustrated relative to the center line 17 of stalk transporter 16. Thus, as shown in FIG. 1, the relative vertical distance between the center line of stalk transporter 16 and the center line of defoliator 18 increases from initial height H0 through intermediate heights H1, H2 and H3, to a final height H4.

It is to be understood that, in some embodiments, the defoliator could be configured so that the zone of engagement varies along the length of the machine, but the defoliator still includes some other components (e.g. frame or support members) which are parallel to the stalk transporter.

In operation, stalk transporter 16 engages one end of the tobacco plant and advances the plant through the machine. Because the stalk transporter 16 and defoliator 18 are not (vertically) parallel to one another, as a tobacco plant advances through the machine, different portions of the stalk engage the defoliating member at different times and different horizontal locations. For example, in this particular embodiment, the base B of each plant is engaged with stalk transporter 16 such that the tobacco plant hangs downward (i.e. the plant is upside-down). However, some or all of the plants could be engaged with stalk transporter 16 at their respective tops T (i.e. the plant is right side up). As the plant is moved in the X direction, first the leaves at zone 1 are engaged, then the leaves at zone 2 are engaged, followed by the leaves in zone 3, and then the leaves in zone 4. As shown at 19, at the end of the stalk transporter 16, the defoliated stalk is ejected from the machine for suitable handling. For example, in this embodiment, the stalk is ejected into a bin at collection area 34.

For example, in some embodiments, stalk transporter 16 may comprise an endless chain featuring spikes which penetrate the stalk S of the tobacco plant and carry the stalk through machine 10. Machine 10 can comprise a chain frame member 14 which may be adjustable to vary the angle $\theta_1$ between the transporter 16 and the defoliator 18. Accordingly, stalks of varying heights can be accommodated using the same machine. For example, plants from a relatively tall crop with leaves that are highly spaced up the stalk may be accommodated by a higher angle $\theta_1$ than a shorter crop with leaves more closely spaced up the stalk.

Figure 5:
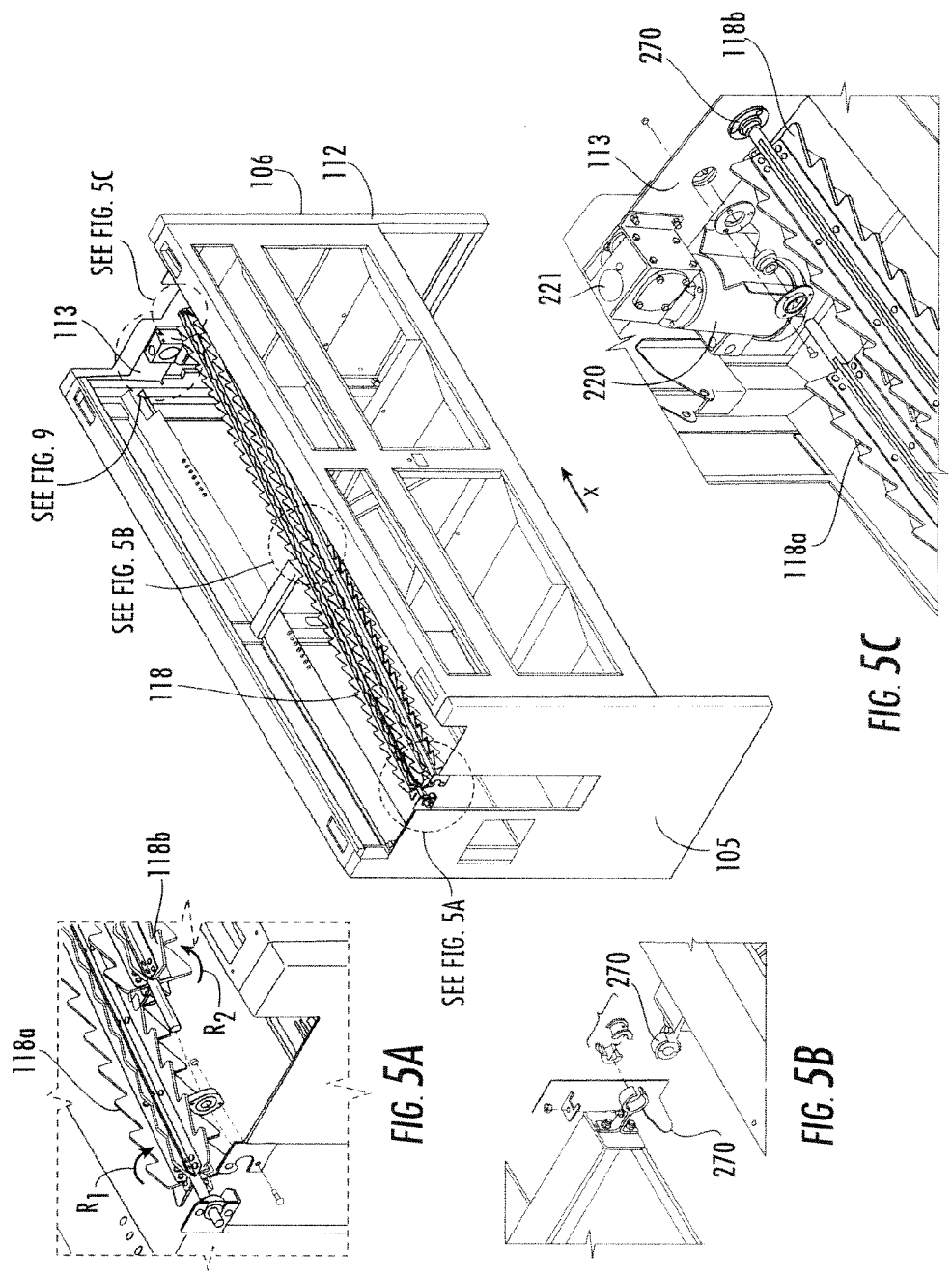
FIG. 5 is a perspective view of parts of a leaf stripping machine, namely a defoliator as positioned on a frame and related components.

Additionally or alternatively, angle $\theta_1$ may be defined by positioning defoliator 18. In FIG. 1, defoliator 18 is positioned parallel to the base of machine 10. However, in some embodiments, defoliator 18 may be positioned so that its height relative to the base of machine 10 decreases along the length of the machine in the X direction as shown in FIG. 5, for example. Transporter 16 may be positioned parallel to the base of machine 10 in such embodiments. In other embodiments, transporter 16 may be positioned so that its height relative to the base of machine 10 increases along the length of the machine in the X direction, while the height of defoliator 18 relative to the base of the machine decreases along the length of the machine in the X direction.

In this example, machine 10 further includes dividers 22, 24, 26, and 28. These dividers may be used to aid in funneling leaves to collection points 20-1, 20-2, 20-3 and 20-4. A collection point 34 is shown collecting defoliated stalks. By varying the height and positioning of the various dividers, leaves can be diverted to appropriate collection points and/or collection apparatus. In this example, bins are positioned at each collection point. Additionally, the size of the bins or other handling apparatus can be varied. For example, if the machine were used to create fewer grades of tobacco, each section and corresponding bin/collection area could extend farther in the X direction. Similarly, if more grades were to be utilized, then the respective sizes of the sections and corresponding bins/collection areas in the X direction could be reduced.

In the examples of FIG. 1, leaves and stalks are collected using bins. Additionally or alternatively, the leaves may be contained in other suitable ways, such as bags. However, it will be understood that leaf stripping/grading machines may be used in conjunction with other conventional machinery in actual operation. For example, rather than using bins or other containers, leaves could be collected using one or more conveyors or other transport apparatus positioned at one or more of the collection points 20-1, 20-2, 20-3, 20-4, 34 for collection and subsequent processing. For instance, one or more conveyors could carry leaves from each collection point to a respective bagging, bailing, or other packaging or processing apparatus. A conveyor could be used, for example, to carry defoliated stalks S away from the machine.

Figure 2:
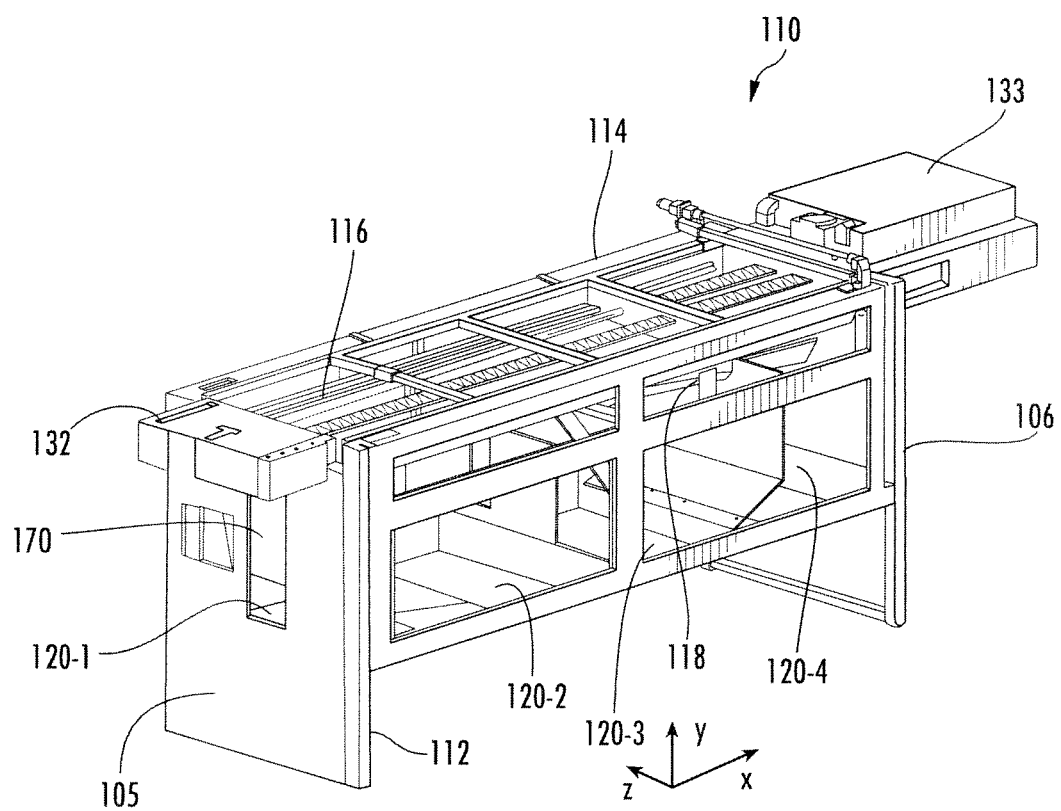
FIG. 2 is a perspective view of an exemplary leaf stripping and grading machine.

FIG. 2 is a perspective view of another exemplary embodiment 110 of a leaf stripping and grading machine. In this example, machine 110 comprises frame 112 and chain frame member 114. Chain frame member 114 supports stalk transporter 116, which serves to carry plants through machine 110 from intake end 105 to output end 106. Additionally, transporter 116 extends outward at intake end 105 to provide intake section 132, which may advantageously allow for insertion of stalks into the chain for carriage by the machine. Also, transporter 116 extends outward at output end 106 to provide ejection section 133, which may allow for ejection of stalks away from the defoliator and graded leaf collection points.

Machine 110 also features defoliator 118, which partially extends along the length of machine 110 in the X direction. In this example, transporter 116 extends a longer length than defoliator 118. This related to the use of intake section 132, and ejection section 133 as noted above, which allows for a short section of the machine to receive stalks before defoliation begins and handle stalks after defoliation ends.

In this example, angle θ1 (not illustrated) is partially defined by the vertical position of defoliator 118. Namely, the vertical distance from the base of frame 112 to defoliator 118 decreases along the length of the machine in direction X. During operation, tobacco plants may be engaged with transporter 116, for example, by inserting the base B or top T of a tobacco plant stalk for engagement by chains included in transporter 116, which carry the plant through opening 170 and along the horizontal length of the machine in direction X. Leaves closest to the transporter 116 are engaged by defoliator 118, and then, as the plant moves along the length of the machine, leaves farther from the transporter 116 are engaged by defoliator 118. For instance, if the base of the plant is engaged with transporter 116, the leaves will be removed from bottom to top. For instance, the leaves near the base may fall to collection point 120-1, with leaves farther up falling at collection point 120-2, 120-3 and 120-4. Finally, the bare stalk may be ejected at output end 106 of machine 110. As was noted earlier, bins, other suitable containers, and/or other apparatus, such as conveyors, may be positioned at the collection points for subsequent handling of the removed leaves and defoliated stalks.

Figure 3:
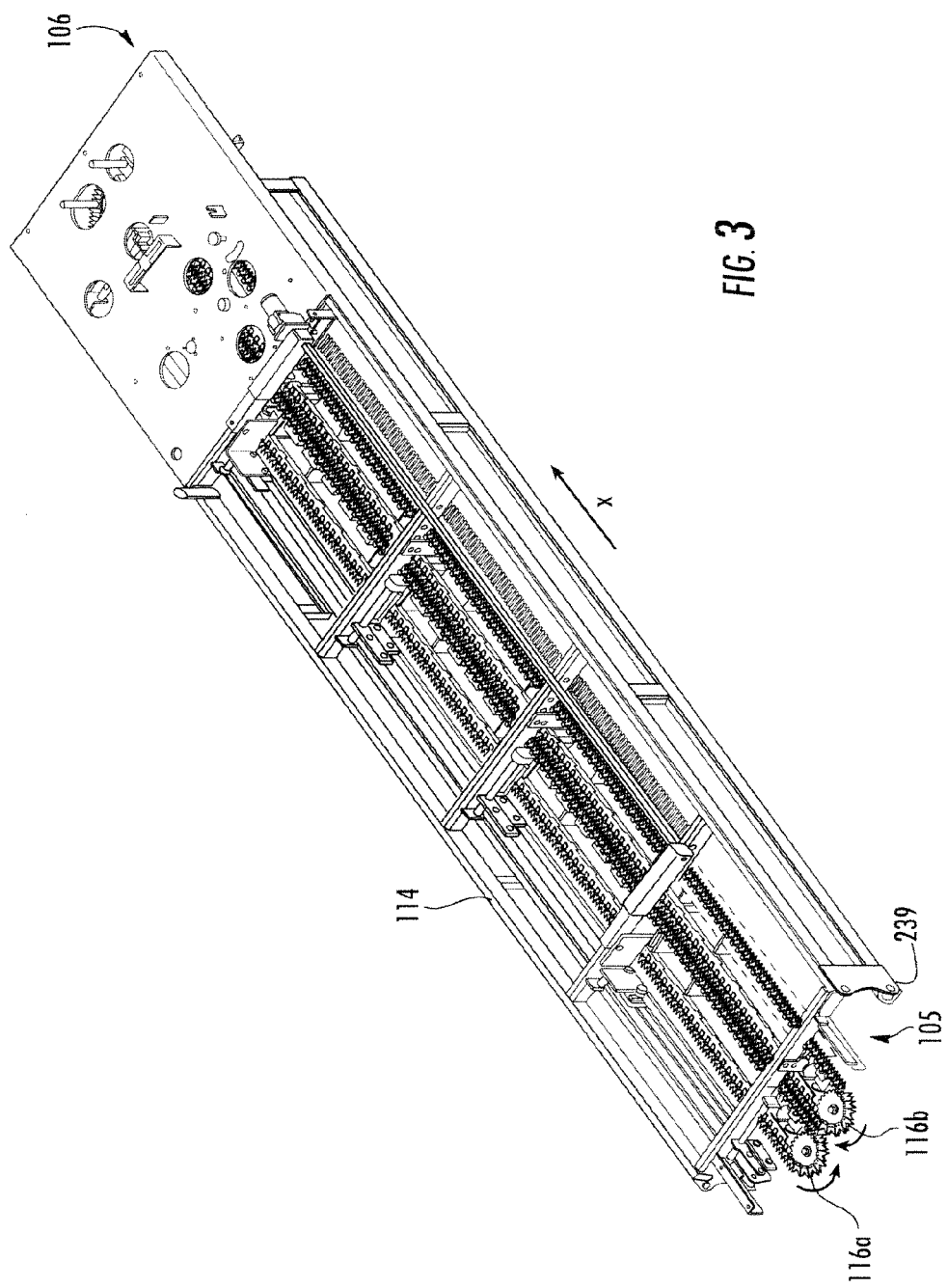
FIG. 3 is a perspective view of an exemplary transporter, in this example a spiked chain.
Figure 4:
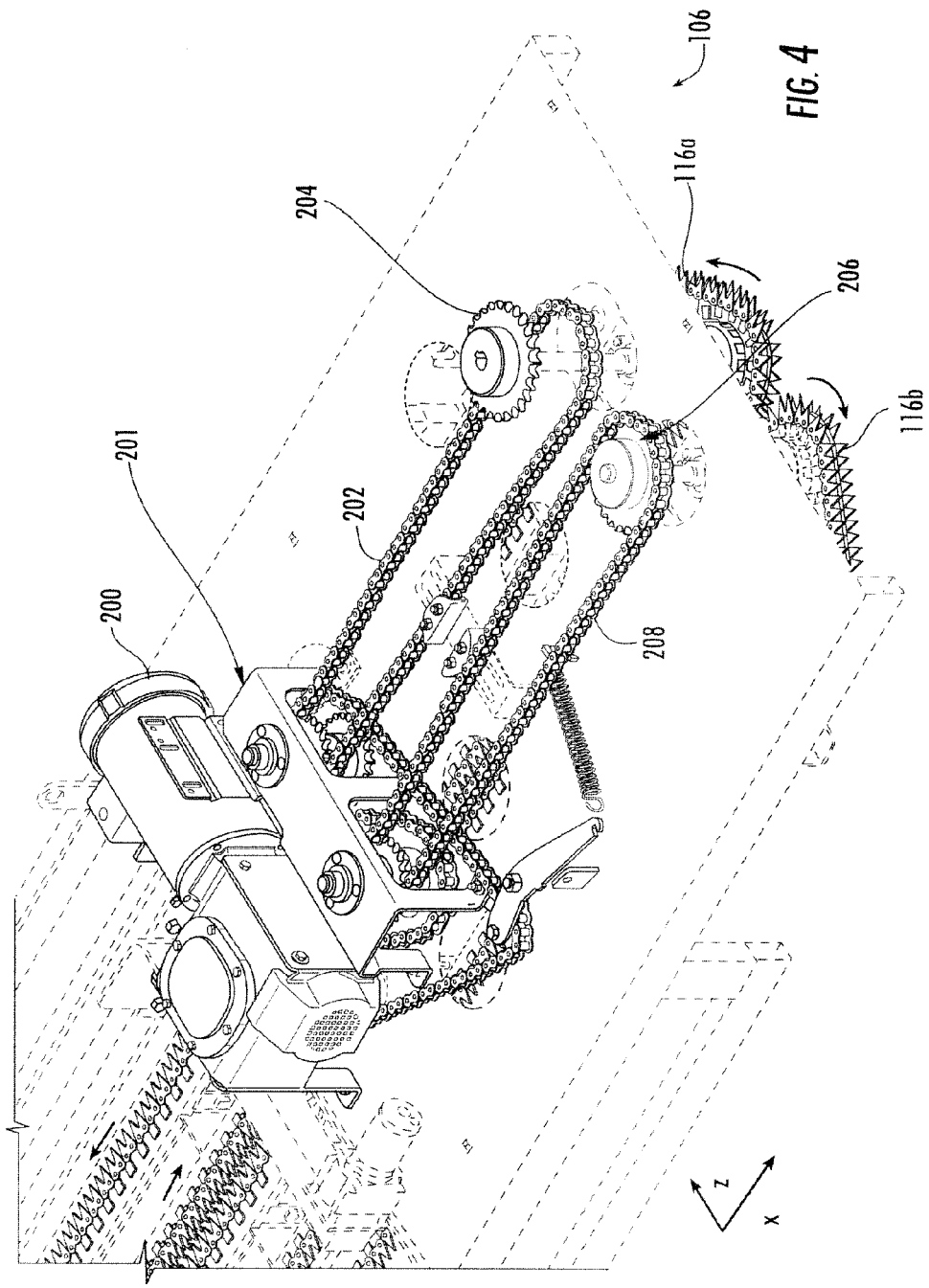
FIG. 4 is a perspective view of drive components for the transporter of FIG. 3.

Turning now to FIGS. 3 and 4, exemplary details of transporter 116 will now be discussed. FIG. 3 illustrates chain frame 114 and accompanying transporter 116 in a perspective view separate from the remaining components of the machine. The X direction and the relative location of intake end 105 and output end 106 are also shown for purposes of illustration. In this example, transporter 116 comprises a pair of endless spiked chains 116A and 116B, which cooperatively penetrate the stalk of a tobacco plant inserted into the machine and carry the stalk along the length of the machine as indicated by the arrows along the chain. One or more chains may be connected to a spring assembly or other components to force chains 116A and 116B toward one another to maintain a sufficient grip on the plant stalks.

As shown in FIG. 4, in this example, chains 116A and 116B are driven using a motor 200 connected via gear box/gear assembly 201, which drives members 204 and 206 via drive chains 202 and 208. Further, in this example, the drive components are carried by the chain frame 114 and are mounted near the output end 106 of the machine. This may advantageously allow for the relative position of chain frame 114 to be varied so that the overall vertical distance between defoliator 118 and transporter 116 can be changed by varying angle θ1. Although a particular motor and gearing assembly is shown, it is to be understood that any suitable drive arrangement can be used. For example, the motor may be hydraulic, pneumatic, or electric. The use of a variable-speed electric motor may advantageously allow for tuning the machine for different plant conditions by changing the speed at which plants are moved along the length of the machine. For example, motor 200 can comprise a three-phase AC motor connected to suitable control apparatus (not shown) including variable-frequency control.

Additionally, although spiked chains 116A and 116B may be advantageous in some embodiments, in other embodiments, transporter 116 can comprise any other suitable attachment or carrying mechanism that engages the stalk and moves it through the machine, such as hooks or clips.

Turning now to FIGS. 5, 6, 7, and 8, exemplary details of defoliator 118 will now be discussed. Beginning with FIG. 5, a view of machine 110 showing frame 112 and defoliator 118 with chain frame 114 and transporter 116 removed is shown. Additionally, FIGS. 5A, 5B and 5C show close-up views of certain portions of FIG. 5. As shown in this example, defoliator 118 is mounted at an angle relative to the base of the frame 112 such that the distance between defoliator 118 and the base of machine 112 decreases along the length of the machine in the X direction. In this example, the slope of defoliator 118 relative to the base of frame 112 is fixed, although it will be understood that the machine could be configured so that defoliator 118 could be variably positioned. In this example, defoliator 118 comprises a pair of counter-rotating rollers 118A and 118B.

Figure 6:
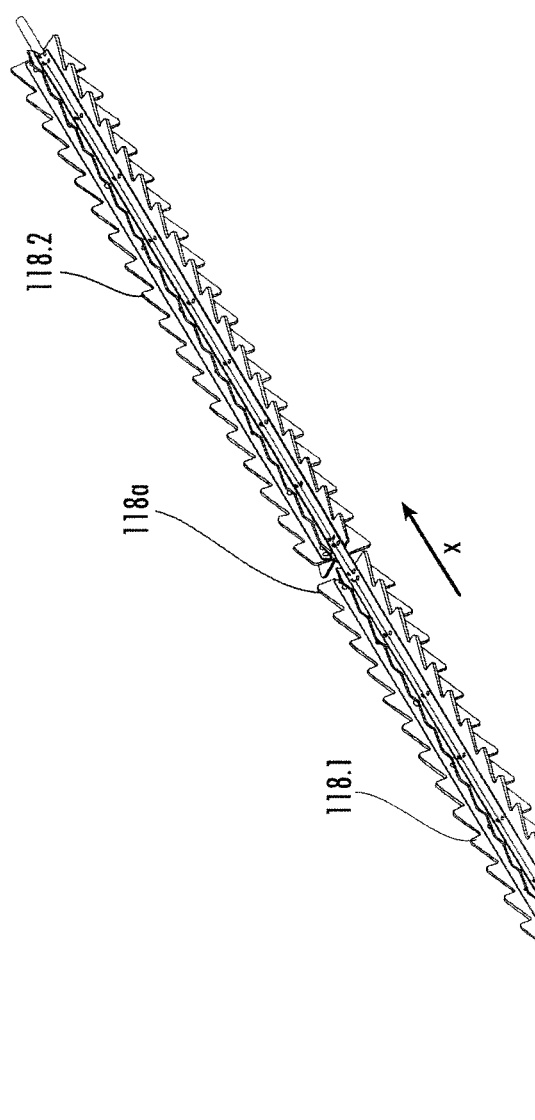
FIG. 6 illustrates an exemplary roller for use in a defoliator.
Figure 6B:
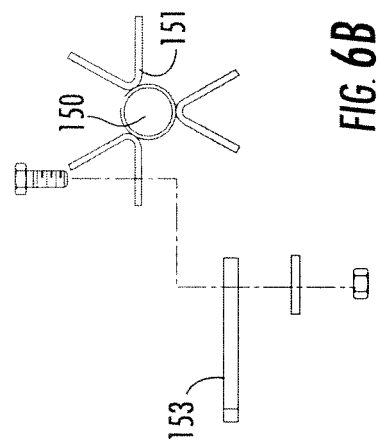
Figure 6A:
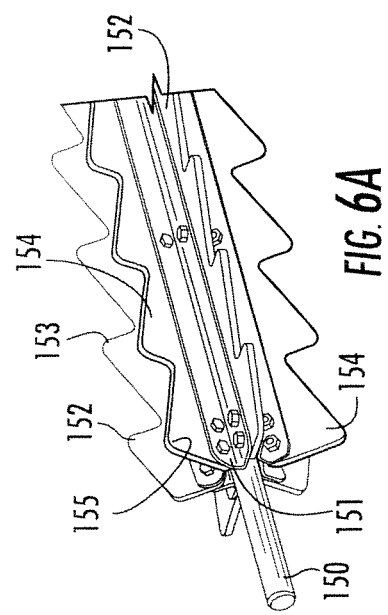

Briefly, FIG. 6 illustrates the particular construction of an exemplary defoliator 118 by illustrating a single defoliator roller 118A on its own. In this example, defoliator 118A is constructed from two segments labeled as 118.1 and 118.2. However, it is to be understood that the defoliator could be comprised of more segments or a single segment in other embodiments. As shown in FIG. 6A, defoliator 118A comprises a shaft 150 and a plurality of defoliator fin assemblies 152 and 154 that are secured to shaft 150. For example, as shown in FIG. 6B, fin assemblies may be bolted to a shaped member 151 which is welded or otherwise attached to shaft 150. Individual fins 153/155 may be bolted to attachment member 151, or one or more groups of fins 153/155 in a continuous piece of material may be bolted to support member 151. In other embodiments, fins or fin assemblies may be attached directly to shaft 150 in any suitable manner. Any suitable material or materials can be used to construct defoliator 118. For example, the fins or fin assemblies may comprise rubber or another rigid or pliable material, with shaft 150 comprising a rigid material, such as steel or aluminum, for example. The fin material should be sufficiently strong to remove leaves from the stalk, but pliable/flexible enough so that leaves/stalks are not mutilated during the defoliation/transport process.

In this example, each fin assembly 152 comprises fins 153, and each fin assembly 154 comprises fins 155. Fins 153 and 155 have different shapes. Specifically, in this example, a given fin assembly 152 is the mirror image of a fin assembly 154 across a plane perpendicular to the roller axis. Put another way, in this example, the sawtooth fins 155 comprising fin assembly 154 "point" in the (+) X direction, while the sawtooth fins 153 comprising fin assembly 152 "point" in the −X direction. In this example, roller 118A comprises three assemblies 152 and three assemblies 154, with the fin assemblies arranged to alternate around shaft 150. However, in other embodiments, the fin assemblies of a particular roller are the same. For instance, in FIG. 11, alternative defoliator 618 comprises a roller 618A with only fin assemblies 154 and a roller 618B with only fin assemblies 152. However, the rollers are mirror images of one another, and therefore define gap space 657 in between. Other shapes or arrangements of fin assemblies could be used.

More details of an example defoliator 118 will now be discussed alongside FIG. 7. FIG. 7A is a top view of a defoliator 118 comprising roller 118A and roller 118B. FIG. 7B is a side view of defoliator 118 showing roller 118B. FIG. 7C is a cross-sectional view along the roller axes, showing rollers 118A and 118B as viewed looking in the −X direction (i.e. viewed from the end of the roller at the right side of the paper). FIG. 7D is a close-up view of a portion of defoliator 118 from the top side.

As shown best in FIGS. 7A, 7C and 7D, rollers 118A and 118B are positioned so that their axes are parallel and the rollers form an overlapping area or "zone of engagement" 500 where fins from the rollers nearly contact one another. During operation, plants move through zone of engagement 500, which extends along the length of the defoliator parallel to the roller axes. When a plant is positioned in the zone of engagement, leaves are removed by the action of blades or fins 153/155. Furthermore, because of the angle of defoliator 118 (and/or the angle at which transporter 116 is positioned), the zone of engagement at which defoliator 118 contacts and removes leaves from a stalk varies along the length of the machine as noted earlier, which allows leaves from different parts of the plant to be removed at different horizontal locations along the machine.

However, the rollers are constructed, arranged, and operated so that, at zone of engagement 500, a "virtual hole" or gap space 157 results. A view of gap space 157 can be seen in the topside view of FIGS. 7A and 7D. Additionally, gap space 157 can be seen in top-side perspective view shown in FIG. 8C. Generally, gap space 157 is sized to accommodate stalks S of the plants as the plants are moved through the machine. Gap space 157 generally comprises a space extending through the plane between the roller axes from the top to the bottom of the zone of engagement, with a cross-section at the plane between the axes approximately sized to accommodate a plant stalk. Due to the rotation of rollers 118A and 118B, fins 153/155 contact the leaves extending from the stalks of the plants and remove the leaves. For instance, if rollers 118A and 118B are properly positioned and fins 153/155 are of a suitable size, most or all of the leaves at the zone of engagement will be removed from stalk S with little or no contact or damage to stalk S.

FIG. 7C is a cross-sectional view of the rollers in FIG. 7A looking down the axis of the roller in the −X direction. Further, in this example, rollers 118A and 118B comprise shafts 150A and 150B, respectively, and each roller comprises a plurality of fins. As noted above, each roller comprises six sets of fins of two alternating types distributed about the radius of its axis.

As shown in FIG. 7C, rollers 118A and 118B are positioned so that, in zone of engagement 500, fins from the rollers alternately pass through the plane defined by the roller axes. Due to the shape and arrangement of the fin assemblies, the stalk S of a plant can be accommodated in the zone of engagement. Thus, stalk S of plant P6 is shown in phantom in this example. Gap space 157, though, is not large enough to accommodate leaves of the plant. Instead, the roller fins strike the leaves in the zone of engagement (illustrated at 500 in FIG. 7B) and remove the leaves from the stalk S. In this example, leaves L7 have been removed from plant P6. Leaves L8, however, are not in the zone of engagement.

Figure 8A:
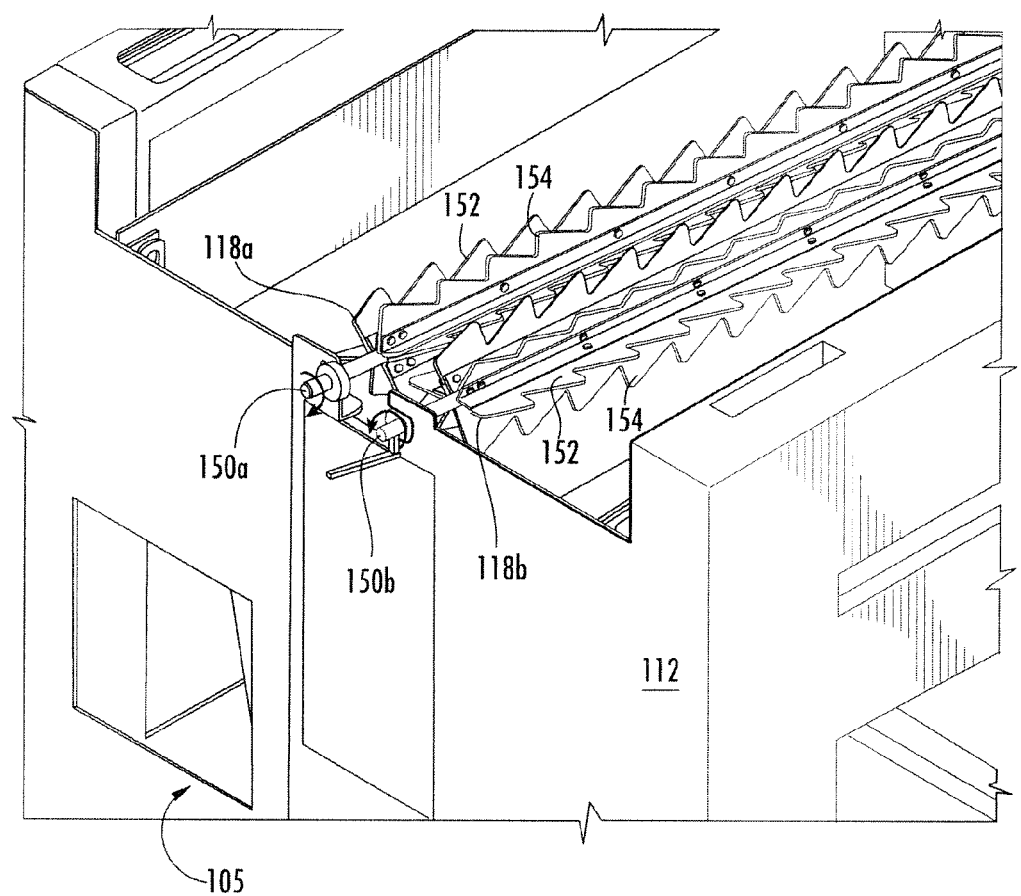
FIG. 8 illustrates a defoliator comprising two rollers in more detail as carried on the frame of a machine.
Figure 8B:
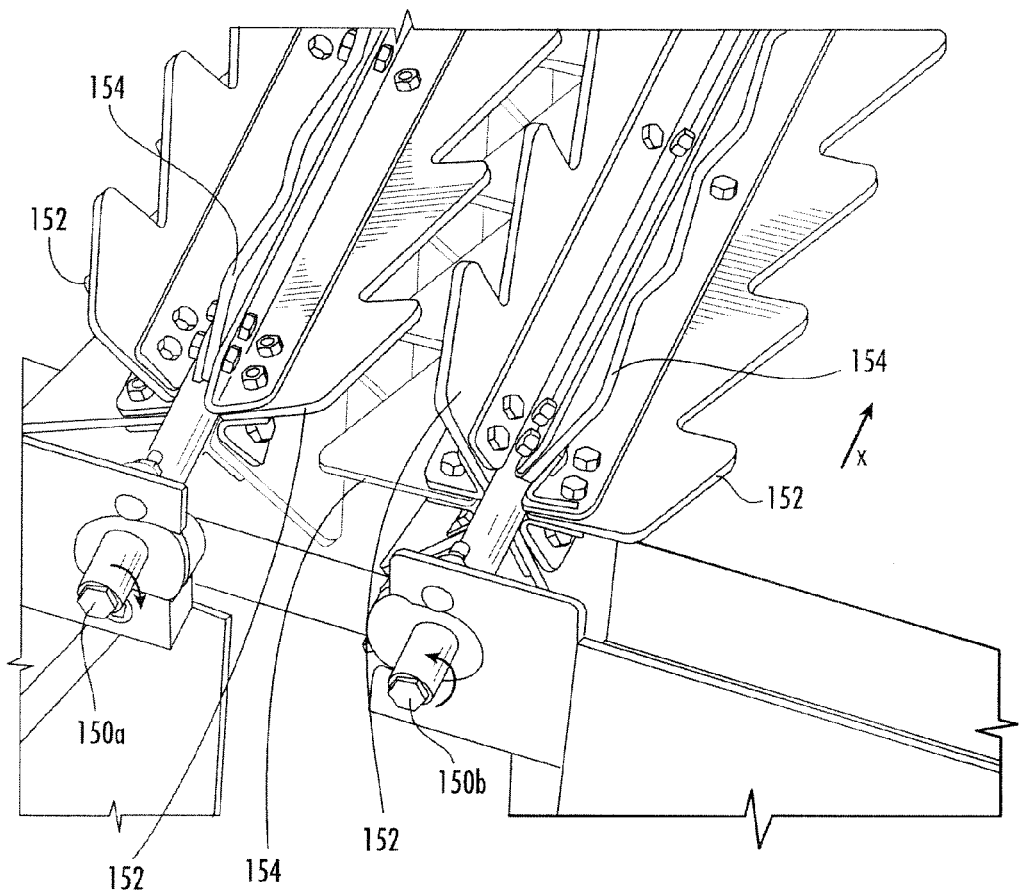
Figure 8C:
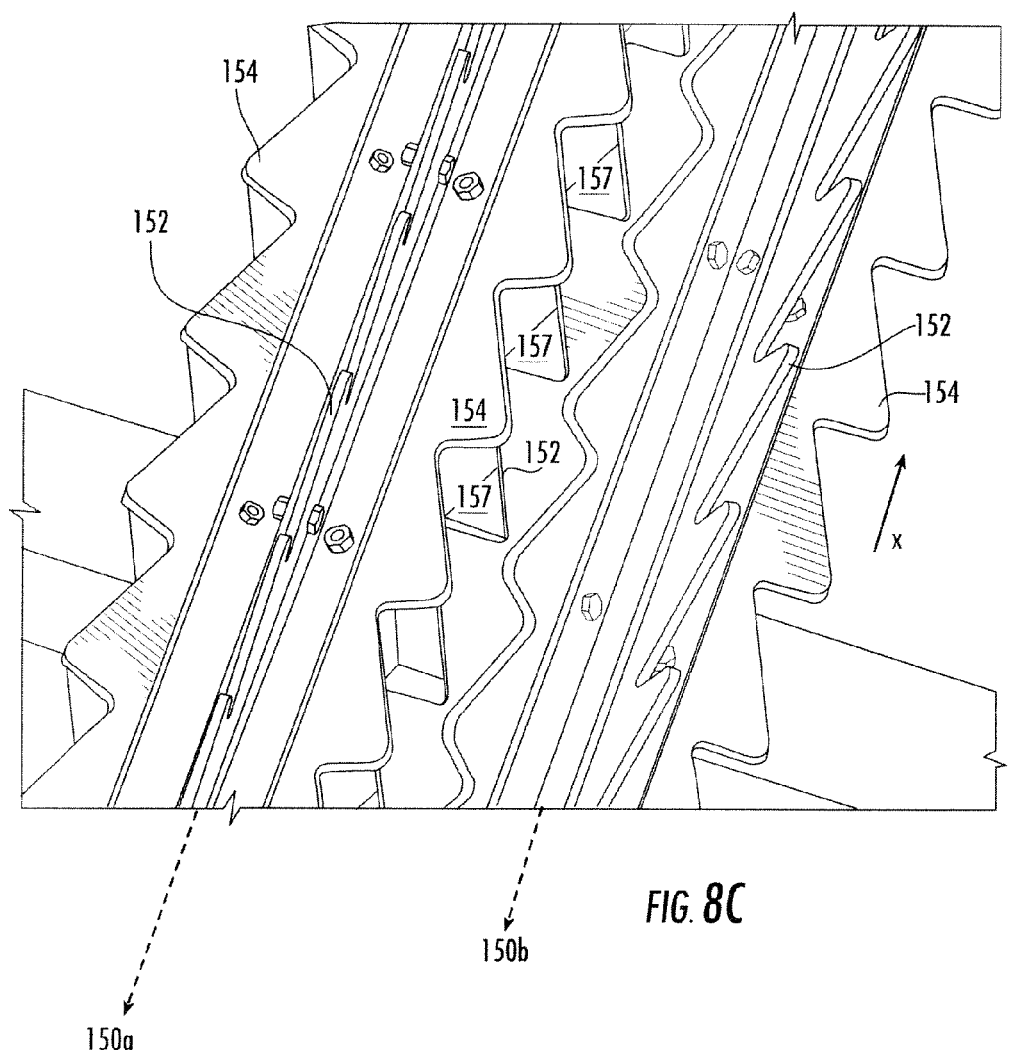
Figure 17:
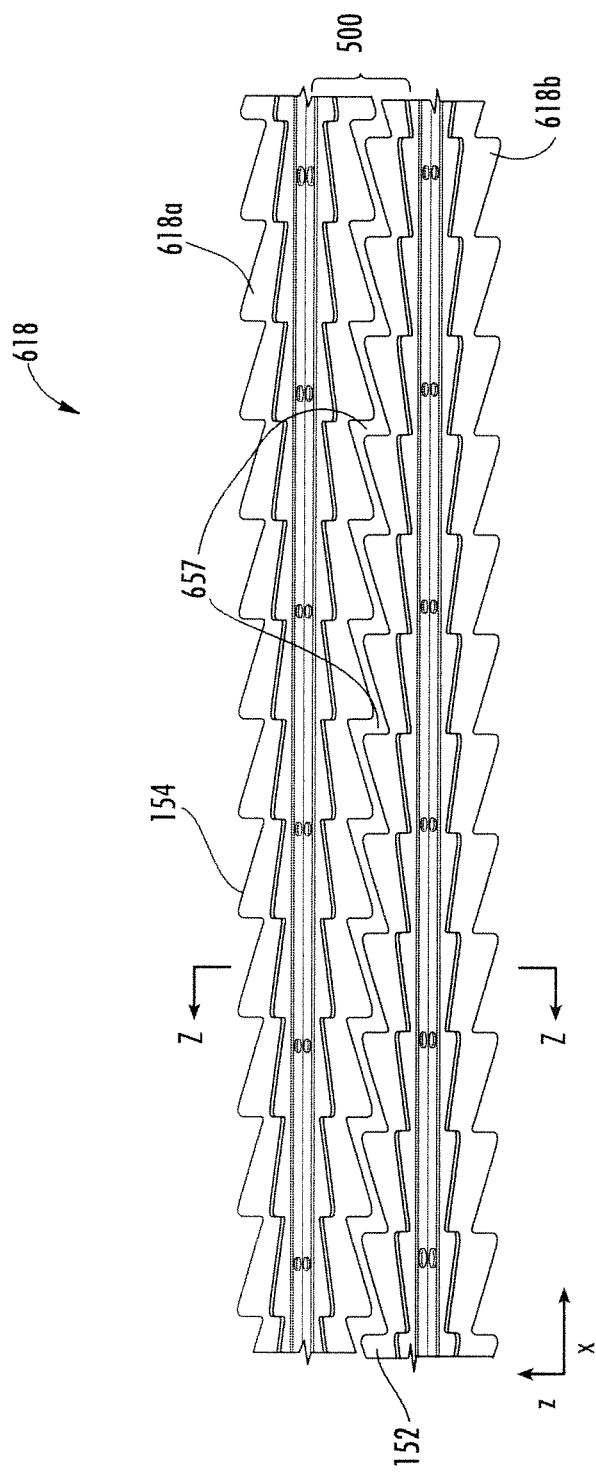

FIGS. 8A and 8B are additional perspective views of defoliator 118 showing rollers 118A and 118B at intake end 105 of a leaf stripping/grading machine, while FIG. 8C is a topside perspective view taken at a location further along the x-axis of the machine. FIGS. 8A and 8B illustrate shafts 150A and 150B and the respective rotation of rollers 118A and 118B. As can be seen from FIGS. 8A, 8B, and 8C, as rollers 118A and 118B counter-rotate, the fin assemblies 152 and 154 sweep through the area between the rollers (i.e. the zone of engagement) while defining gap spaces 157 which can each accommodate a plant stalk. Since the rollers are moving, the defoliated stalks S can slip from one gap space 157 to another as the stalks are moved along the length of the machine.

Exemplary details of operating defoliator 118 will now be discussed in conjunction with FIG. 5 and FIG. 10. The counter-rotating rollers can be driven in any suitable manner. For example, as shown in FIG. 5A, which is a close-up view of the end of defoliator 118 at intake end 105, rollers 118A and 118B can be driven to rotate in directions R1 and R2, respectively. In this example, roller 118A is driven so that roller 118A rotates in a clockwise direction when viewed from end 105 of machine 110. Roller 118B is driven to rotate in the opposite direction (i.e. counter clockwise) when viewed from end 105 of machine 110. However, it is to be understood that the directions of rotation could be reversed in other embodiments. As shown in FIGS. 5A and 5C, rollers 118A and 118B can be supported by bearings at respective ends of machine 110. In this example, at output end 106, the shafts of rollers 118A and 118B are supported by bearings mounted on a support member 113. Also mounted to support member 113 is a motor 220 and a gearbox 221. In FIG. 5B, midpoint bearings 270 are shown supporting rollers 118A and 118B at the mid-point of the machine. In some embodiments, however, more intermediate supports could be used, or no intermediate supports could be used.

Turning now to FIG. 9, additional details regarding motor 220, gearbox 221 and the drive configuration in this embodiment will be discussed. FIG. 9A depicts a first side of support member 113, namely the side of support member 113 that faces toward the intake end 105 of the machine. For a better view, rollers 118A and 118B are omitted in FIG. 9A, and only the bearing supports 272 are shown. In this example, motor 220 is connected to gearbox 221 which transfers power to a drive assembly located on the opposite side of support member 113. The opposite side of support member 113 is shown in FIG. 9B. Motor 220 may be hydraulic, pneumatic, or electric. The use of a variable-speed electric motor may advantageously allow for tuning the machine for different plant conditions by changing the speed at which plants are moved along the length of the machine and the rate at which leaves are stripped as the plant moves. For example, motor 200 can comprise a three-phase AC motor connected to suitable control apparatus (not shown) including variable-frequency control.

The side of support member 113 that faces toward output end 106 of the machine is shown in FIG. 9B. In this view, the ends of rollers 118A and 118B can be partially seen opposite the drive assembly on the other side of support member 113. The drive shaft 221A from gearbox 221 extends through support member 113 and is coupled to a chain 222 via sprocket 228. Drive chain 222 is connected to sprockets 224 and 230, which are connected to drive the shafts of rollers 118A and 118B respectively. Additionally, idler 226 is also used as part of the drive assembly in this example.

FIG. 9C shows the sprockets and idler and chain in isolation. The motion of the components illustrated in FIG. 9C is as it would appear when viewed from output end 106 of machine 110. As shown in FIG. 9C, sprocket 228 is driven by shaft 221A to rotate as shown by arrow R3. Drive chain 222 transfers motion to sprockets 224 and 230 to impart opposite rotation as illustrated by arrows R4 and R5. Idler 226 also rotates appropriately to transfer motion. Rollers 118A and 118B, which are connected to sprockets 224 and 230, are thus driven in opposite directions. In this example, as viewed from output end 106, roller 118B rotates in a clockwise direction while roller 118A rotates in a counter clockwise direction. The directions of rotation are consistent with those of the example shown in FIG. 5A, which defined the rotation as viewed from the opposite end (i.e. from end 105).

Turning now to FIG. 10, a view of frame 112 and chain frame 114 is shown to illustrate one possible embodiment in which the angle of the transporter 116 can be varied with regard to defoliator 118. In this example, frame 112 includes a lift member 232, which can extend to support the end of chain frame 114 at end 106 so as to raise that end of chain frame 114. As shown in FIG. 10A, a pivot assembly can be included so that the height can be easily varied. In this example, pin 234 passes through hole 239 in chain frame 114 and through a corresponding hole 238 attached to frame 112. Pin 234 can be secured, for example, using clip 236. Of course, it will be understood that other pivot assemblies could be used and/or the relative height of chain frame 114 could be varied in other manners.

Although the examples above discussed removal of leaves from burley tobacco, aspects of the present subject matter could be applied to other types of tobacco and/or to other types of plants. Further, although sawtooth-shaped fins are discussed, other shapes could be used.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art

What is claimed:

1. A leaf stripping machine comprising:
   a frame having a horizontal length from a first end to a second end;
   a stalk transporter positioned on the frame and configured to engage at least one plant stalk and move the at least one plant stalk from the first end to the second end of the leaf stripping machine;
   a defoliator positioned on the frame, the defoliator configured to remove at least some leaves from the plant stalk falling within an engagement zone on the at least one plant stalk;
   wherein an angle of the stalk transporter is variable with respect to the defoliator so that the location of the engagement zone varies along the horizontal length of the frame.

2. The leaf stripping machine set forth in claim 1, wherein the stalk transporter and defoliator are positioned on the frame so that the relative vertical distance between the stalk transporter and defoliator increases along the horizontal length of the frame from the first end to the second end.

3. The leaf stripping machine set forth in claim 1, wherein the defoliator comprises a first and second roller each extending at least partially along the length of the frame, the rollers positioned side-by-side to define the engagement zone.

4. The leaf stripping machine set forth in claim 3, wherein each roller comprises a plurality of fins attached to a shaft, the fins arranged so that, as the rollers rotate, at least one gap space is defined, wherein the fins do not contact material in the gap space.

5. The leaf stripping machine set forth in claim 4, wherein the fins comprise rubber.

6. The leaf stripping machine set forth in claim 1, wherein the stalk transporter comprises a plurality of spiked chains extending along the length of the frame and configured to form a stalk nip that penetrates the stalk.

7. The leaf stripping machine set forth in claim 6, wherein the stalk transporter comprises a chain frame extending along the length of the frame and carrying the plurality of spiked chains, and wherein the chain frame is pivotable about an angle at the first end of the machine so that the chain frame can be variably positioned relative to the remainder of the machine.

8. The leaf stripping machine set forth in claim 1, wherein the defoliator is positioned so that the relative vertical distance between the defoliator and the base of the frame decreases along the length of the machine.

9. The leaf stripping machine set forth in claim 1, further comprising at least one divider positioned under the defoliator.

10. A method of stripping leaves attached to a plant stalk, the method comprising:
    transporting at least one plant stalk along a stalk transporter positioned on a frame of a leaf stripping machine, wherein the stalk transporter engages the at least one plant stalk and moves the at least one plant stalk from a first end to a second end of the frame;
    engaging the at least one plant stalk with a defoliator positioned on the frame to remove at least some of the leaves from the at least one plant stalk;
    wherein an angle of the stalk transporter is variable with respect to the defoliator so that the location of the engagement zone varies along the horizontal length of the frame.

11. The method set forth in claim 10, transporting comprises engaging the stalk with a spiked chain extending along the distance.

12. The method set forth in claim 10, wherein engaging the stalk with a defoliator comprises moving the stalk between two rolls defining an engagement zone.

13. The method set forth in claim 10, further comprising:
    at a first location, collecting leaves which were removed from a first vertical position on the stalk; and
    at a second location, collecting leaves which were removed from a second vertical position on the stalk.

14. The method set forth in claim 10, wherein the leaves comprise tobacco leaves.

15. A leaf stripping machine comprising:
    a frame having a horizontal length from a first end to a second end;
    a stalk transporter positioned on the frame and configured to engage at least one plant stalk and move the at least one plant stalk from the first end to the second end of the leaf stripping machine;
    a defoliator positioned on the frame, the defoliator configured to remove at least some leaves from the plant stalk falling within an engagement zone on the at least one plant stalk;
    the defoliator comprising:
    a first and second roller, each roller having an axis;
    wherein the rollers are positioned side-by-side such that the axes of the rollers are parallel;
    wherein each roller comprises a plurality of fins that rotate about the axis of the roller, each fin has a sawtooth shape, and the plurality of fins on the first roller are a mirror image of the plurality of fins on the second roller;
    wherein the fins of each roller are shaped so that as sets of fins from the first roller and sets of fins from the second roller are alternately rotated into the plane defined by the roller axes, the set of fins from the first roller and the set of fins from the second roller substantially fill respective portions of the plane without overlapping and define a gap space sized to accommodate a plant stalk; and,
    wherein an angle of the stalk transporter is variable with respect to the defoliator so that the location of the engagement zone varies along the horizontal length of the frame.

16. The defoliator set forth in claim 15, wherein each roller comprises at least six sets of fins.

17. The defoliator set forth in claim 15, wherein the fins comprise rubber.

18. The defoliator set forth in claim 15, wherein each roller comprises a shaft along the axis of the roller, and the fins are attached to the shaft so that the fins rotate about the axis of the roller when the shaft is rotated.

* * * * *